United States Patent
Jha et al.

(10) Patent No.: US 8,280,872 B1
(45) Date of Patent: Oct. 2, 2012

(54) AUTOMATED ROUTING OF FORUM POSTINGS

(75) Inventors: Nandan Jha, Ghaziabad (IN); Smriti Mehra, Ghaziabad (IN)

(73) Assignee: Adobe Systems Incorporated, San Jose, CA (US)

( * ) Notice: Subject to any disclaimer, the term of this patent is extended or adjusted under 35 U.S.C. 154(b) by 347 days.

(21) Appl. No.: 11/843,833

(22) Filed: Aug. 23, 2007

(51) Int. Cl.
G06F 7/00 (2006.01)
G06F 17/30 (2006.01)

(52) U.S. Cl. ....... 707/708; 707/771; 707/922; 705/7.14; 705/304; 706/48

(58) Field of Classification Search ........... 707/999.003, 707/999.01, 999.1, 999.104, 705
See application file for complete search history.

(56) References Cited

U.S. PATENT DOCUMENTS

| | | | |
|---|---|---|---|
| 5,311,572 A * | 5/1994 | Friedes et al. | 379/211.02 |
| 6,026,148 A * | 2/2000 | Dworkin et al. | 379/88.18 |
| 6,557,027 B1 * | 4/2003 | Cragun | 709/204 |
| 6,807,566 B1 * | 10/2004 | Bates et al. | 709/206 |
| 6,938,068 B1 * | 8/2005 | Kraft et al. | 709/203 |
| 7,305,436 B2 * | 12/2007 | Willis | 709/204 |
| 7,310,658 B2 * | 12/2007 | Giles et al. | 709/206 |
| 7,418,437 B1 * | 8/2008 | Marks | 707/1 |
| 7,424,516 B2 * | 9/2008 | Leeds | 709/206 |
| 7,519,626 B2 * | 4/2009 | McCormack et al. | 1/1 |
| 7,904,523 B2 * | 3/2011 | Cragun | 709/206 |
| 2001/0049722 A1 * | 12/2001 | Bush | 709/204 |
| 2002/0016787 A1 * | 2/2002 | Kanno | 707/5 |
| 2002/0062368 A1 * | 5/2002 | Holtzman et al. | 709/224 |
| 2002/0087520 A1 * | 7/2002 | Meyers | 707/3 |
| 2002/0133388 A1 * | 9/2002 | Lauffer | 705/8 |
| 2003/0028441 A1 * | 2/2003 | Barsness et al. | 705/26 |
| 2003/0028525 A1 * | 2/2003 | Santos et al. | 707/3 |
| 2003/0144895 A1 * | 7/2003 | Aksu et al. | 705/9 |
| 2004/0111467 A1 * | 6/2004 | Willis | 709/203 |
| 2004/0128357 A1 * | 7/2004 | Giles et al. | 709/206 |
| 2006/0123060 A1 * | 6/2006 | Allen et al. | 707/200 |
| 2006/0174340 A1 * | 8/2006 | Santos et al. | 726/21 |
| 2006/0287989 A1 * | 12/2006 | Glance | 707/3 |
| 2007/0050459 A1 * | 3/2007 | Kikugawa | 709/206 |
| 2007/0124432 A1 * | 5/2007 | Holtzman et al. | 709/219 |
| 2007/0233622 A1 * | 10/2007 | Willcock | 706/16 |
| 2008/0040427 A1 * | 2/2008 | Shroff et al. | 709/204 |
| 2008/0077461 A1 * | 3/2008 | Glick | 705/7 |
| 2009/0013046 A1 * | 1/2009 | Lee et al. | 709/206 |
| 2009/0019026 A1 * | 1/2009 | Valdes-Perez et al. | 707/5 |

* cited by examiner

*Primary Examiner* — Robert Beausoliel, Jr.
*Assistant Examiner* — Susan F Rayyan
(74) *Attorney, Agent, or Firm* — Schwegman Lundberg Woessner P.A.

(57) ABSTRACT

Various embodiments described herein include one or more of systems, software, and methods to receive and automatically route forum postings to individuals tasked with responding to the postings. Some such embodiments extract keywords from the text of such postings and use the extracted keywords and keyword-responder mappings to identify a responder capable of responding to the posting. Some embodiments include generating or updating keyword-responder mappings by identifying keywords included in posting responses made by each responder.

20 Claims, 5 Drawing Sheets

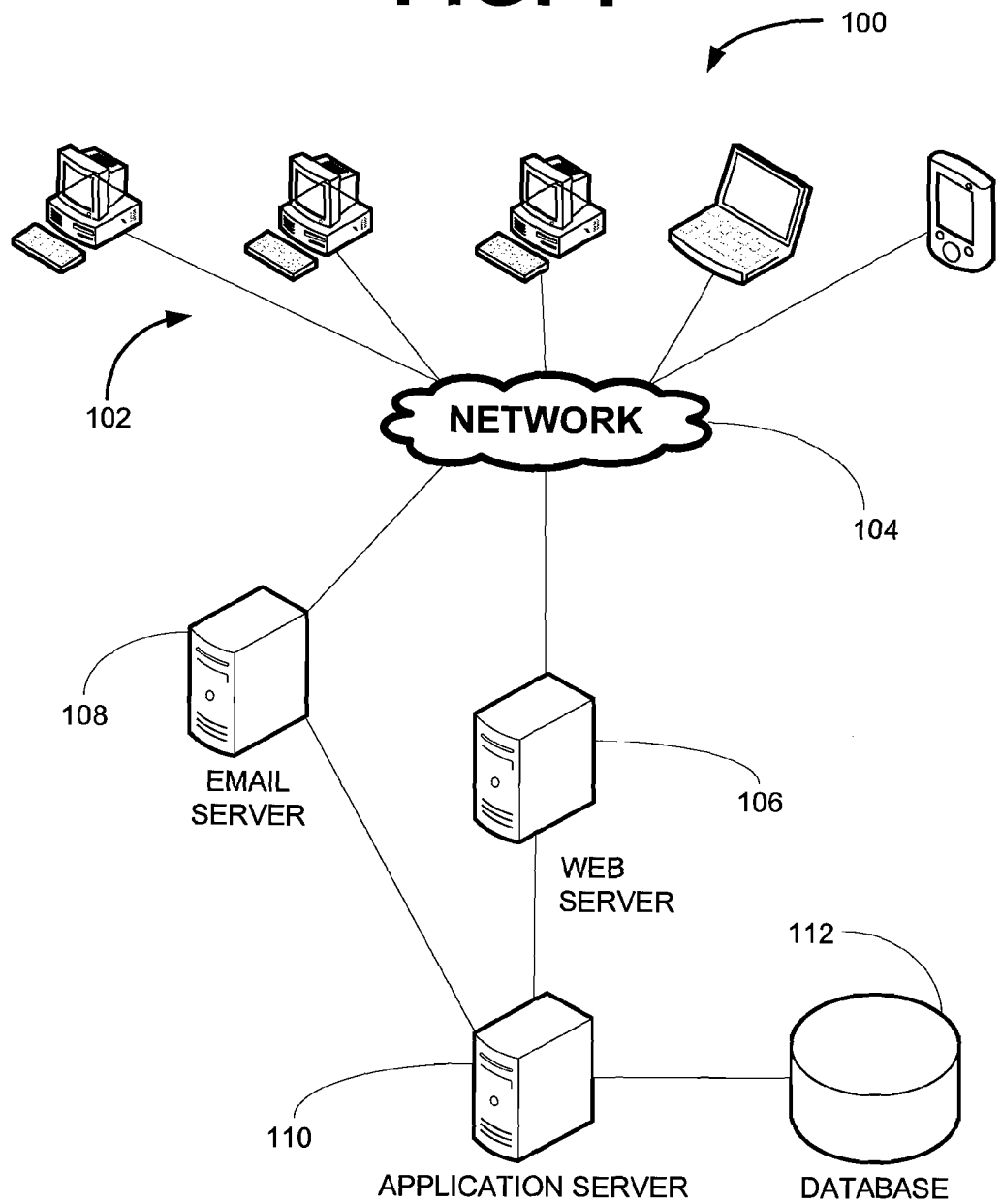

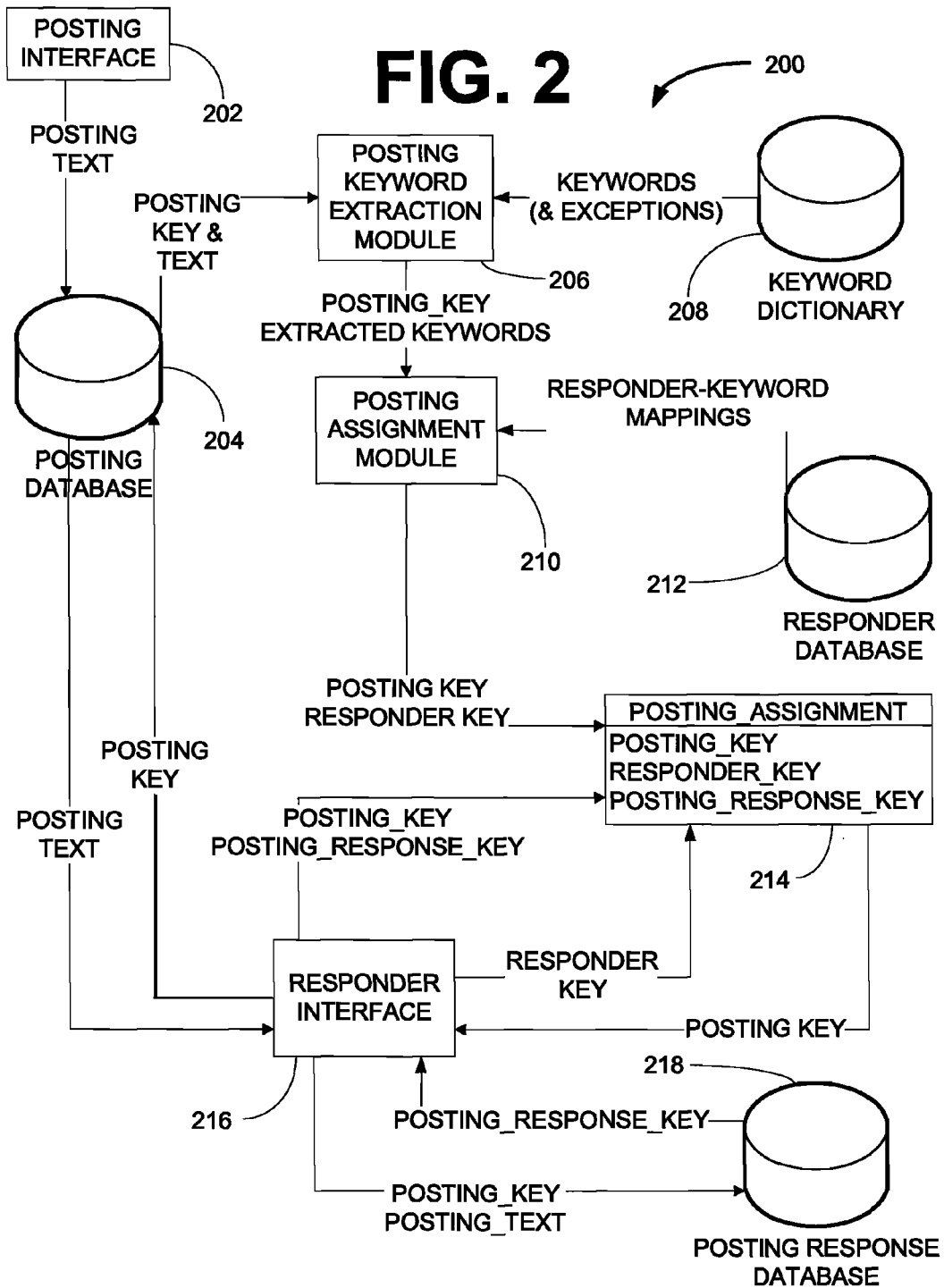

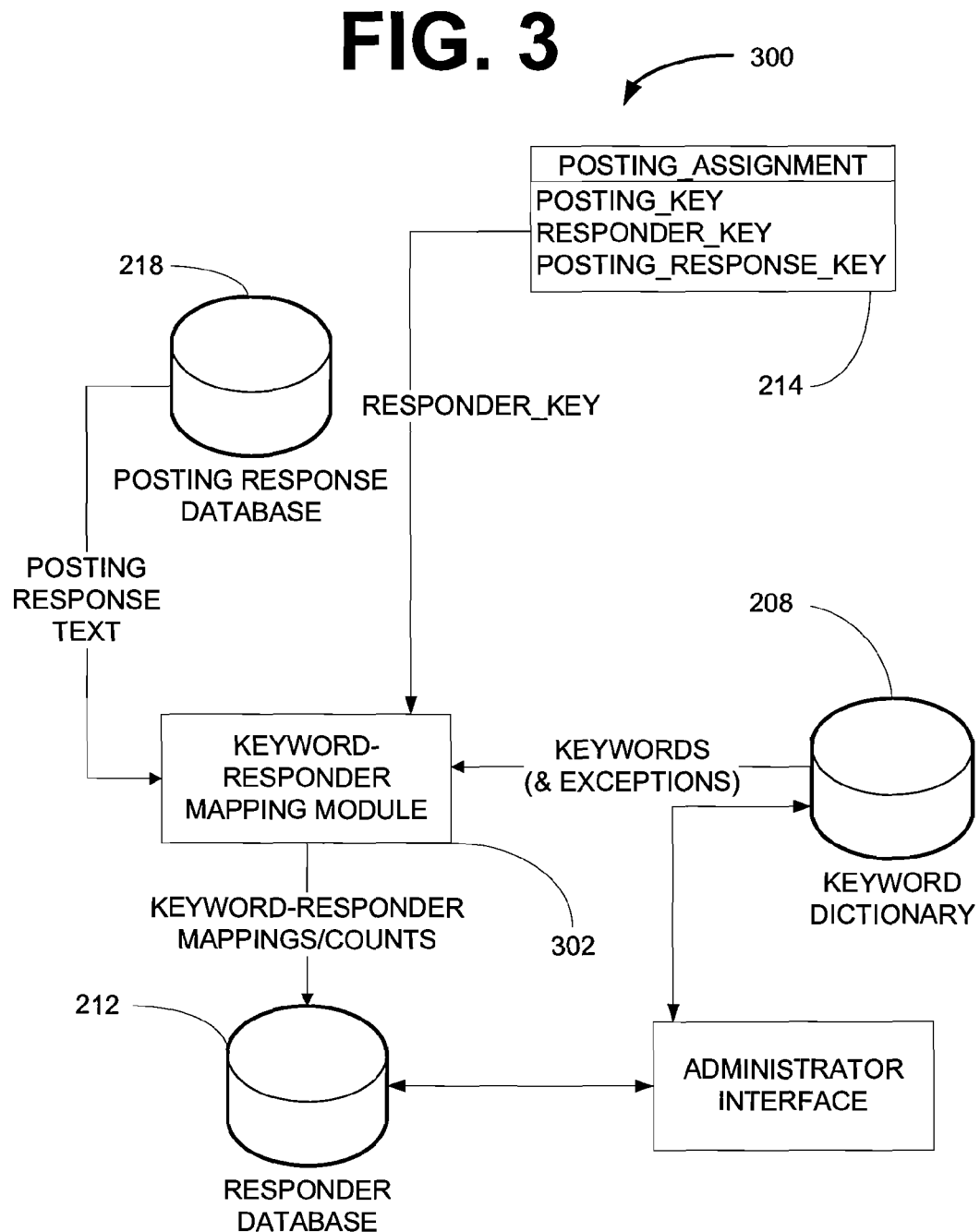

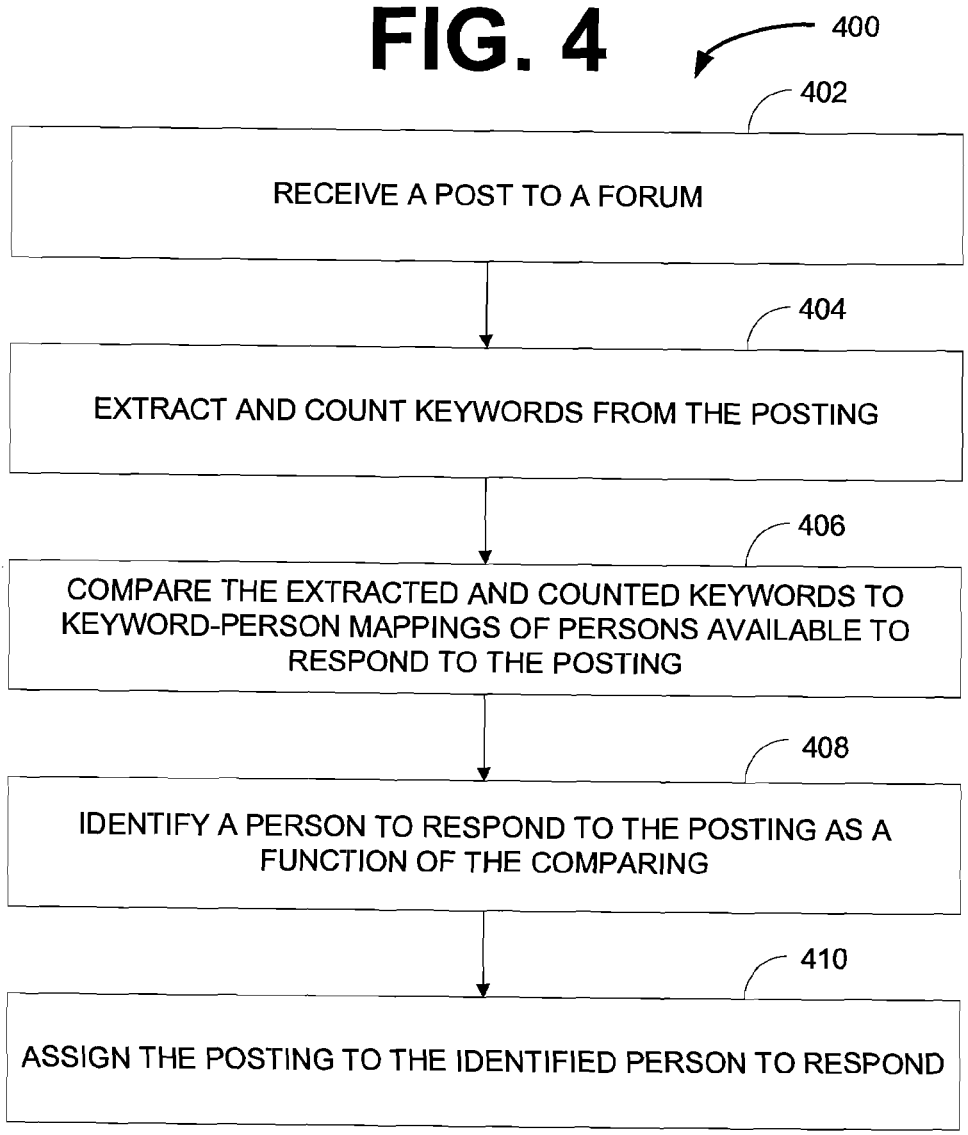

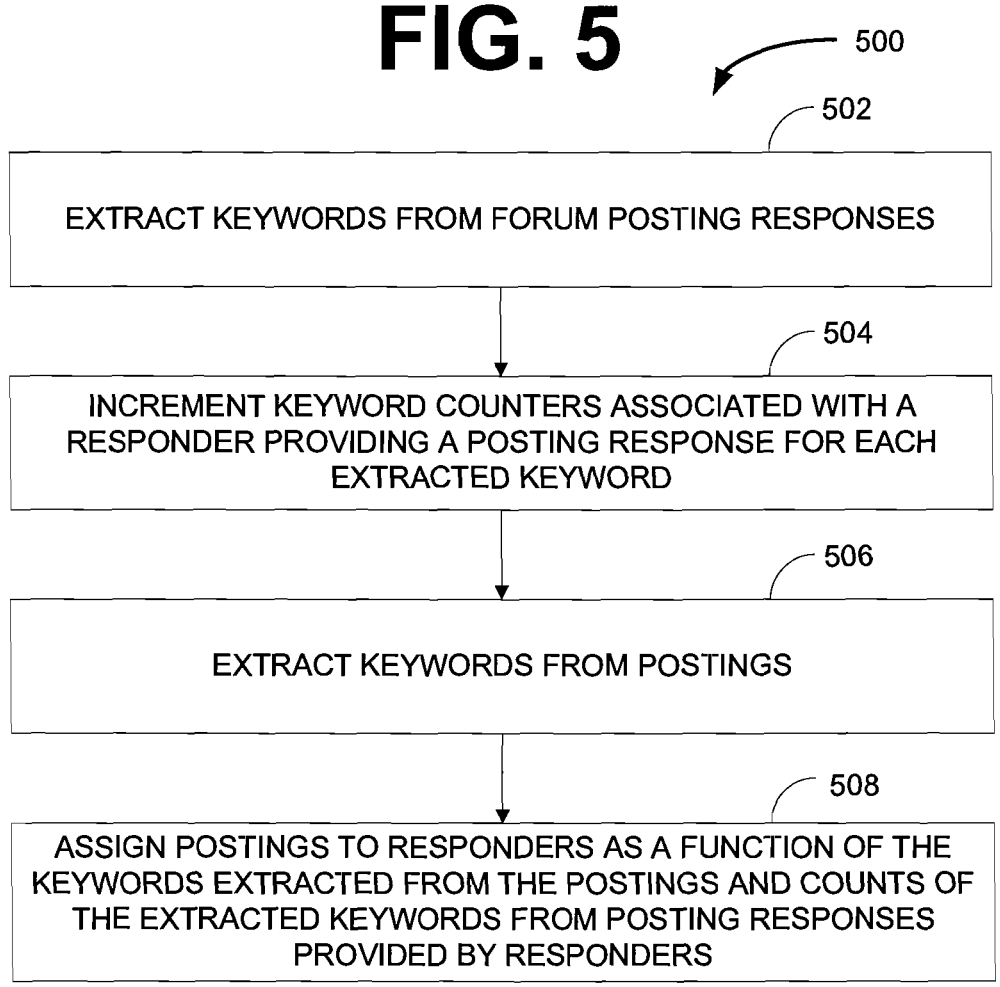

US 8,280,872 B1

AUTOMATED ROUTING OF FORUM POSTINGS

BACKGROUND INFORMATION

Many enterprises provide user and development forums where individuals may post questions and issues related to services and products offered by an enterprise. These forums are typically offered over the Internet and submissions are received through one or both of web pages and emails. These forums are typically administered by the enterprise and postings are replied to by employees of the enterprise or by members of user groups.

The employees or user group members tasked with responding to postings sift through the postings to find postings they are able to respond to. The posts and responses may be provided though a web page or other interface or in email. However, there is no guarantee that a response will be provided. Further, the employee or user group member providing a response may not be fully qualified or most qualified to provide a response. As a result, the integrity of such forums may be compromised which may cause greater call volumes to expensive help desks and otherwise discourage users and developers from continued use of products and services offered by such enterprises.

BRIEF DESCRIPTION OF THE DRAWINGS

FIG. 1 is an architectural diagram of a system according to an example embodiment.

FIG. 2 is a logical block diagram of a system according to an example embodiment.

FIG. 3 is a logical block diagram of a system according to an example embodiment.

FIG. 4 is a logical block diagram of a method according to an example embodiment.

FIG. 5 is a logical block diagram of a method according to an example embodiment.

DETAILED DESCRIPTION

Various embodiments described herein include one or more of systems, software, and methods to receive and automatically route forum postings to individuals tasked with responding to the postings. In some such embodiments, keywords are extracted from forum posting responses and stored with an association to a responder providing a response to the respective posting. A keyword-responder association may include a count which may also be tracked by month or other period. Such keyword-responder associations may then be used to identify responders that are likely to have knowledge enabling them to reply to specific posts by matching keywords extracted from postings with keyword-responder associations. These and other embodiments are illustrated in the figures and described in greater detail below.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

FIG. 1 is an architectural diagram of a system 100 according to an example embodiment. The system 100 provides an example architecture upon which forum postings may be made, stored, and responded to over a network 104, such as the Internet, an intranet, or other network. The system 100 may include any number of clients 102 that access a forum over the network 104.

The clients 102 may include one or more of desktop computers, laptop computers, personal digital assistants ("PDA"), smart phones, set top boxes, and virtually any other device capable of receiving human input, communicating over a network 104, and providing output, such as through a display.

The architecture of a forum type system 100 typically includes a web server 106 that receives forum requests and postings from clients 102 over the network 104. The web server 106 may be a self contained server and provide all forum functions from within. However, in other embodiments, the web server 106 may just serve web pages created. In other embodiments, the web server 106 may serve web pages with data retrieved from an application server 110 or webpages generated on demand and provided to the web server 106 by an application server 110.

The application server 110 may include one or more processes to serve one or more of data and webpages to the web server 106. The web server 106 may provide retrieval arguments to retrieve data or generate webpages. The web server 106 may also provide data to the application server 110 to store. In some embodiments, the application server 110 accesses and stores data. The data may be stored in local memory of a computing device upon which the application server 110 executes or another storage location such as a database 112. In some embodiments, the application server 108 may also, or alternatively, interact with postings received via an email server 108.

In some embodiments, the application server 110, upon receipt of a forum posting via the web server 106 or email server 108, extracts keywords from the text of the posting. A posting may be virtually any message sent to an enterprise or other organization. The message may be submitted with regard to a certain product or service offered or provided by the enterprise, or may be a general message.

The keyword extraction is generally performed to identify a topic of the received posting to enable a determination to be made about how to route the posting. The keyword extraction may be performed to extract keywords from the text of a posting that are included in a keyword dictionary. A keyword, in some embodiments, may include more than one word, such as "Internet Protocol" or "application configuration setting." The keyword extraction may also, or alternatively, include an exception list of words to ignore. Exception words are typically words that should be ignored because the words do not help identify a topic of the posting, or otherwise are determined to be irrelevant. Conversely, keywords are words that are identified as words that may be used to help identify a topic of a posting. However, in some embodiments, a precise topic of a posting need not be determined. Instead, a person capable, typically most capable, of providing a response to a post is identified by comparing keywords extracted or remaining in the text of a posting with keywords included in posting responses from a group of posting responders. Thus, the application server 110 includes, or has access to, a database 112 holding a mapping of keywords to people tasked with responding, referred to at times herein as responders.

The mapping of keywords to responders, in some embodiments, includes a mapping of keywords identified in posting responses provided by each responder to the responder providing the response within which the keywords are identified. In some embodiments, each keyword-responder mapping may include a count of a number of times each keyword is included in a posting response provided by a respective responder. For example, if an identified keyword is "compression," a keyword-responder mapping may include a count of thirty-eight meaning that the respective responder has provided posting responses including the keyword "compression" thirty-eight times.

When a posting is submitted from one of the clients 102 over the network 104, a process on the application server first extracts keywords, such as the keyword "compression." The same process, or another, then queries the keyword-responder mappings to identify a responder to receive the posting to respond to. In some embodiments, identifying a responder most capable of responding to the posting is as simple as identifying a responder having a highest keyword-responder count for the keyword "compression." Thus, continuing with the keyword-responder mapping of the above example, if a second responder includes a count of fifty-three for the keyword "compression," in such embodiments, the second responder may be considered the most capable responder to respond to the posting including the keyword "compression" and the second responder receives the posting to respond to.

In some embodiments, keyword-responder mappings may include keyword-responder mappings by month, or other period. Such embodiments provide an adaptive solution that accounts for changes in knowledge of responders used in providing posting responses. For example, if a first responder over a first month includes a certain keyword many times and a second responder includes the certain keyword few times, the first responder is deemed most capable of responding to postings including the certain keyword. However, if after one or more additional periods the first responder uses the certain keyword few times and the second responder uses the certain keyword many times, the second responder may then be deemed the most capable of providing such posting responses.

In these, and further embodiments, availability of responders is also accounted for. For example, if a responder is on vacation, leaves an organization, or is otherwise not available, the absent responder may be designated as inactive. As a result, the one or more processes that operate to assign postings to responders will ignore inactive responders. Thus, although an inactive responder may have the highest count for one or more keywords, those counts and the associated responder will not be accounted for in determining which responder to assign postings including those keywords. Further detail of these and other embodiments are described below and illustrated in the figures.

FIG. 2 is a logical block diagram of a system 200 according to an example embodiment. The example system 200 includes two interfaces, a posting interface 202 and a responder interface 216.

The posting interface 202 is operable on a computing device, such as one of the client 102 computing devices illustrated in FIG. 1. The posting interface 202 provides a mechanism by which a posting, as described above, may be sent. A posting response may also be retrieved and viewed though the posting interface 202. The posting interface 202, in a typical web page embodiment, includes one or more webpages having text boxes to receive input, textual areas to provide instructions and other information, and one or both of buttons and hyperlinks to submit data and requests and receive additional data or webpages. In email embodiments, the posting interface 202 may be an email application. The email application may be used to draft email postings addressed to an email address of a forum.

The responder interface 216 is operable on a computing device, such as one of the client 102 computing devices illustrated in FIG. 1. The responder interface 216 is typically used by each of several individuals tasked with providing responses to submitted postings. The responder interface 216, in some embodiments, allows a responder to view a listing of assigned postings, view the text of each posting, and input and submit responses to individual postings. The interface may be embodied in one or more webpages viewable through a web browser. The responder interface 216 may alternatively include a standalone database enabled application.

The system 200 also includes further modules and elements that process, store, and route data between the posting interface 202 and the responder interface 216. These modules and elements are commonly included as processes on an application server and databases or database tables managed by a database management system. The modules and elements, in some embodiments include a posting database 204 to store text and information associated with postings received from posting interfaces 202, a posting keyword extraction module 206 to extract keywords from postings received into the posting database 204, and a posting assignment module 210 to assign postings stored in the posting database 204 to a responder represented in a responder database 212 as a function of the keywords extracted by the posting keyword extraction module 106.

An example processing flow of these portions of the system 200 includes posting text being submitted though a posting interface 202 and stored in the posting database 204. The posting text and a database key, which may be named "POSTING_KEY," of a posting database record of the received posting are then retrieved by or pushed to the posting keyword extraction module 206. The posting keyword extraction module 206 then extracts keywords from the posting text. The keywords are identified for extraction, in some embodiments, by searching for words in the posting text that are included in a keyword dictionary 208. In some embodiments, the keyword dictionary 208 may also include a set of words to ignore in the posting text. These ignore words are exceptions. However, in other embodiments, only exception words exist in the keyword dictionary. In such embodiments, the exception words are removed from the posting text.

After the keywords are extracted, or only the non-exception words remain, they are sent, along with the POSTING_KEY, to the posting assignment module 210. The posting assignment module 210 uses the keywords to identify a responder represented in the responder database most capable of responding to the posting. The responder database 212 not only includes a representation of each of a group of responders, but also a keyword-responder mapping of keywords used by each responder in posting responses provided by respective responders.

In some embodiments, the extracted keywords, or remaining non-exception words, are used as retrieval arguments of one or more responder database 212 queries. In some embodiments, a responder identifier, which may be named "RESPONDER_KEY," is retrieved for each responder having provided a posting response including any of the extracted keywords, or remaining non-exception words. Such responders will be called relevant responders. Then another query may be submitted for each relevant responder using the retrieved RESPONDER_KEYs as retrieval arguments to obtain a count of how many of the keywords are included in posting responses provided by each of the relevant responders.

In other embodiments, the keyword-responder mappings include a count of a number of times each keyword has been used by the respective responder in posting responses. In such embodiments, the RESPONDER_KEY of each relevant responder is used as a retrieval argument to retrieve a count of a number of extracted keyword, or remaining non-exception word, occurrences in posting responses provided by each relevant responder.

In some further embodiments, for which more detail will be provided below, the keyword-responder mappings are maintained in period tables. For example, responder-keyword mappings, and counts if included in an embodiment, are stored in tables for designated periods. Thus, a keyword-mapping table for each month may be utilized. In such embodiments, the relevant responder query may be performed against a subset of these period tables, such as the tables for the most recent three months. The counts may also be performed against this subset of keyword-mapping tables and data. As a result, the posting assignment module 210 is adaptive to changes in responder activity over time.

In either embodiments, the counts may then be evaluated to identify a responder to which the posting should be assigned. In some embodiments, the responder receiving the posting assignment may be the responder having a highest count. However, some embodiments may take into account a number of pending posts assigned to responders before assigning further posts. For example, two responders have equal counts, the posting assignment module may assign the new posting to the responder have fewer outstanding postings to respond to. Further, if a responder having a highest count has outstanding postings awaiting response, but another responder having few or no outstanding postings but still has a count greater than a certain threshold which may be number or percentage of the highest count, for example, the responder having the lesser count may receive the posting assignment.

The responder database 212 may also include an active/inactive flag for each responder which may be set to inactive for periods when individual responders are not available. The active/inactive flag may be taken into account when the relevant responders are retrieved, after the counts are made, or another time before the actual posting assignment is made.

Once the posting assignment module 210 has determined which responder to assign the posting to, the POSTING_KEY of the posting and the RESPONDER_KEY of the responder to receive the posting assignment are stored in a posting assignment table 214 or database. The posting_assignment table 214 may be a table in one or more of the posting database 204, responder database 212, a posting response database 218 which will be described in greater detail below, other database, or other data structure. Note that the posting_assignment table 214 also includes a POSTING_RESPONSE_KEY column to hold a record identifier, or other identifier, to link a posting to a posting response provided by a responder identified by the RESPONDER_KEY.

After the assignment module 210 has made the assignment, the responder receiving the assignment may view the assignment via the responder interface 216. To view outstanding assignments, the responder interface 216, or backend process such as an application server process, retrieves the POSTING_KEYS from the posting_assignment table 214 where the RESPONDER_KEY equals that of the retrieving responder and the POSTING_RESPONSE_KEY is null or is otherwise empty. The outstanding postings may then be retrieved and displayed in a listing to the responder from which a posting may be selected. Upon selection of a posting to view, the POSTING_KEY of the selected posting is used as a retrieval argument to retrieve the posting text from the posting database 204. After retrieval, the posting may be displayed in the responder interface 216.

Using the responder interface 216, the responder may then provide a response to a viewed posting, the text of which is sent to and stored in the posting response database 218. The posting response database 218, in some embodiments, includes a record for each posting response and assigns a POSTING_RESPONSE_KEY to each record. The POSTING_RESPONSE_KEY is typically returned to the responder interface 216. The responder interface 216 may then store the POSTING_RESPONSE_KEY in the posting_assignment table 214 of the record corresponding to the POSTING_KEY of the posting responded to.

Although the posting database 204, keyword dictionary 208, responder database 212, posting response database, and posting_assignment table 214 are illustrated and described as separate data storage elements, some of the data may be shared or combined between them. Further, these data storage elements may all be part of the same database, file and folder storage schema, or other data arrangement depending on the requirements and needs for the specific embodiment.

FIG. 3 is a logical block diagram of a system 300 according to an example embodiment. The system 300 provides an example embodiment of updating the keyword-responder mappings stored in the responder database 212 as described above with regard to FIG. 2. The system 300 includes the posting response database 218, the keyword dictionary 208, the responder database 212, and the posting_assignment table 214. The system 300 further includes a keyword-responder mapping module 302. The keyword-responder mapping module 302 is operative to identify keywords used in posting response provided by individual responders and to cause a representation of the keyword usage by responders to be included in the keyword-responder mappings.

In some embodiments, the keyword-responder mapping module receives posting response text from the posting response database and a RESPONDER_KEY from the posting_assignment table 214 of a responder that provided the posting response. The keyword-responder mapping module 302 also retrieves the keywords included in the keyword dictionary 208, and exception words if there are any, and extracts the keywords from the posting response text. In some embodiments, counts of each unique keyword in the posting response text are made.

The keyword responder mapping module 302, after extracting the keywords from the posting response text, updates the keyword-responder mappings associated with the RESPONDER_KEY of the responder providing the posting response. Updating the keyword responder mappings may include creating a keyword record for an extracted keyword for which a keyword-responder mapping did not previously exist. Updating the keyword responder mappings may also include incrementing a counter of each unique extracted keyword by one where the keyword-responder mappings identify a number of posting responses including the keyword. In other embodiments, where a count of a number of times each unique keyword is included in the posting response, the count is added to a counter of the corresponding keyword-responder mapping. In such embodiments, the keyword-responder mappings indicate a number of times the associated keyword has been used by the responder in posting responses.

In some embodiments, the system 300 also includes an administrator interface 304. The administrator interface 304 may be a part of another interface, such as the responder interface 216 of FIG. 2. The responder interface may be a standalone application or one or more webpages which display data to an administrator or other user and receive input, such as input to manipulate settings, keywords, responder data, and the like.

The administrator interface 304, in some embodiments, is operable to display a listing and allow manipulation of keywords stored in the keyword dictionary 208. Manipulation of the keywords may include creating new keywords or modifying and deleting existing keywords.

The administrator interface 304 may also provide mechanisms by which to view and manipulate keyword-responder mappings stored in the responder database 212. This manipulation may include creation of new mappings, such as to account for newly received training on a particular topic, identified by one or more new keywords, by a responder. An active/inactive flag, as described above, may also be manipulated through the administrator interface to account for or schedule absences of responders.

FIG. 4 is a logical block diagram of a method 400 according to an example embodiment. The example method 400 is a method of automatic assignment of forum postings to responders. In some embodiments, the method 400 includes receiving a post to a forum 402, extracting and counting keywords from the posting 404, and comparing the extracted and counted keywords to keyword-person mappings of persons available to respond to the posting 406. The method 400 typically also includes identifying a person to respond to the posting as a function of the comparing 408 and assigning the posting to the identified person to respond 410.

In some embodiments of the method 400, the keyword-person mappings are generated by extracting keywords from each posting response and incrementing a counter of each keyword extracted from a respective posting response that is associated with the person providing the response to the respective posting. The keywords may be extracted from one or both of a posting response title or posting response text. The counter of each keyword associated with the person providing the posting response typically includes a date that is updated with a date the respective counter was last incremented. Identifying a person to respond to the posting 408 may include identifying a person as a function of how recently the identified person provided a posting response including at least one of the keywords of the posting.

In further embodiments of the method 400, assigning the posting to the identified person 410 is performed by sending the posting to an inbox of the identified posting. In some such embodiments, the inbox of the identified person is a forum posting inbox accessible via a web page. In other embodiments, the inbox maybe an email inbox.

FIG. 5 is a logical block diagram of a method 500 according to an example embodiment. The method 500 is an example embodiment of updating keyword-responder mappings used to assign postings to responders. In some embodiments, the example method 500 includes extracting keywords from forum posting responses 502, incrementing keyword counters associated with a responder providing a posting response for each extracted keyword 504, and extract keywords from postings 506. The method 500 also includes assigning postings to responders as a function of the keywords extracted from the postings and counts of the extracted keywords from posting responses provided by responders 508. Some embodiments may include recounting keywords in posting responses of each responder on a periodic basis.

In some embodiments, the method 500 may further include receiving a subsequent posting response from a responder, extracting and counting keywords from the subsequent posting response, and updating the keyword counts of the responder as a function of the counted keywords. Such embodiments, when an extracted keyword does not already existing in the dictionary, may include adding the extracted keyword to the dictionary.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in a single embodiment to streamline the disclosure. This method of disclosure is not to be interpreted as reflecting an intention that the claimed embodiments of the inventive subject matter require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
    receiving a posting to a forum, the posting requesting a response;
    extracting a keyword from the posting;
    retrieving a responder identifier by executing a first query with the extracted keyword as a retrieval argument of the first query, the responder identifier corresponding to a person available to provide the response;
    obtaining a count of keywords by executing a second query with the responder identifier as a retrieval argument of the second query, the count of keywords quantifying a number of times the keyword is included in responses provided by the person available to provide the response;

identifying the person as a responder to respond to the posting based on the count of keywords; and assigning the posting to the identified person to provide the response.

2. The method of claim 1, wherein the extracting of the keywords includes searching a keyword dictionary for a set of exception words to ignore.

3. The method of claim 1, wherein the identifying of the person as the responder is based on the count of keywords being highest among a plurality of counts of keywords corresponding to a plurality of responder identifiers corresponding to a plurality of persons.

4. The method of claim 3, wherein the identifying of the person as the responder is based on the count of keywords being highest among the plurality of keywords counted within a time period.

5. The method of claim 4, wherein the identifying of the person as the responder is based on the count of keywords being stored in a table that corresponds to the time period.

6. The method of claim 1, wherein the identifying of the person as the responder is based on a further count of pending posts assigned to the person.

7. The method of claim 1, wherein the identifying of the person as the responder is based on the count of keywords failing to transgress a threshold number.

8. The method of claim 1, wherein the identifying of the person as the responder is based on the count of keywords failing to transgress a threshold percentage of a highest count among a plurality of counts of keywords.

9. The method of claim 1 further comprising:

extracting further keywords from the responses provided by the person during a time period;

storing the extracted further keywords in a keyword dictionary; and wherein the executing of the first query is based on the keyword dictionary.

10. The method of claim 9, further comprising:

counting the extracted further keywords;

storing counts of the further keywords as being associated with the person in a responder database; and wherein the executing of the second query is based on the responder database.

11. The method of claim 1, wherein the extracting of the keywords extracts the keywords from a title of the posting.

12. A system comprising:

a posting web interface to receive a posting to a forum, the posting requesting a response;

a keyword extraction module to extract a keyword from the posting; and a processor of a machine configured by a posting assignment module to:

retrieve a responder identifier by executing a first query with the extracted keyword as a retrieval argument of the first query, the responder identifier corresponding to a person available to provide the response;

obtain a count of keywords by executing a second query with the responder identifier as a retrieval argument of the second query, the count of keywords quantifying a number of times the keyword is included in responses provided by the person available to provide the response;

identify the person as a responder to respond to the posting based on the count of keywords; and assign the posting to the identified person to provide the response.

13. The system of claim 12, wherein the keyword extraction module is to search a keyword dictionary for a set of exception words to ignore.

14. The system of claim 12, wherein the posting assignment module is to identify the person as the responder based on the count of keywords being highest among a plurality of counts of keywords corresponding to a plurality of responder identifiers corresponding to a plurality of persons.

15. The system of claim 14, wherein the posting assignment module is to identify the person as the responder based on the count of keywords being highest among the plurality of keywords counted within a time period.

16. The system of claim 15, wherein the posting assignment module is to identify the person as the responder based on the count of keywords being stored in a table that corresponds to the time period.

17. The system of claim 12, wherein the posting assignment module is to identify the person as the responder based on a further count of pending posts assigned to the person.

18. The system of claim 12, wherein the posting assignment module is to identify the person as the responder based on the count of keywords failing to transgress a threshold percentage of a highest count among a plurality of counts of keywords.

19. A non-transitory computer-readable medium storing instructions that, when executed by one or more processors of a machine, cause the machine to perform operations comprising:

receiving a posting to a forum, the posting requesting a response;

extracting a keyword from the posting;

retrieving a responder identifier by executing a first query with the extracted keyword as a retrieval argument of the first query, the responder identifier corresponding to a person available to provide the response;

obtaining a count of keywords by executing a second query with the responder identifier as a retrieval argument of the second query, the count of keywords quantifying a number of times the keyword is included in responses provided by the person available to provide the response;

identifying the person as a responder to respond to the posting based on the count of keywords; and assigning the posting to the identified person to provide the response.

20. The non-transitory computer-readable medium of claim 19, wherein the identifying of the person as the responder is based on a further count of pending posts assigned to the person.

* * * * *